Patented Nov. 16, 1937

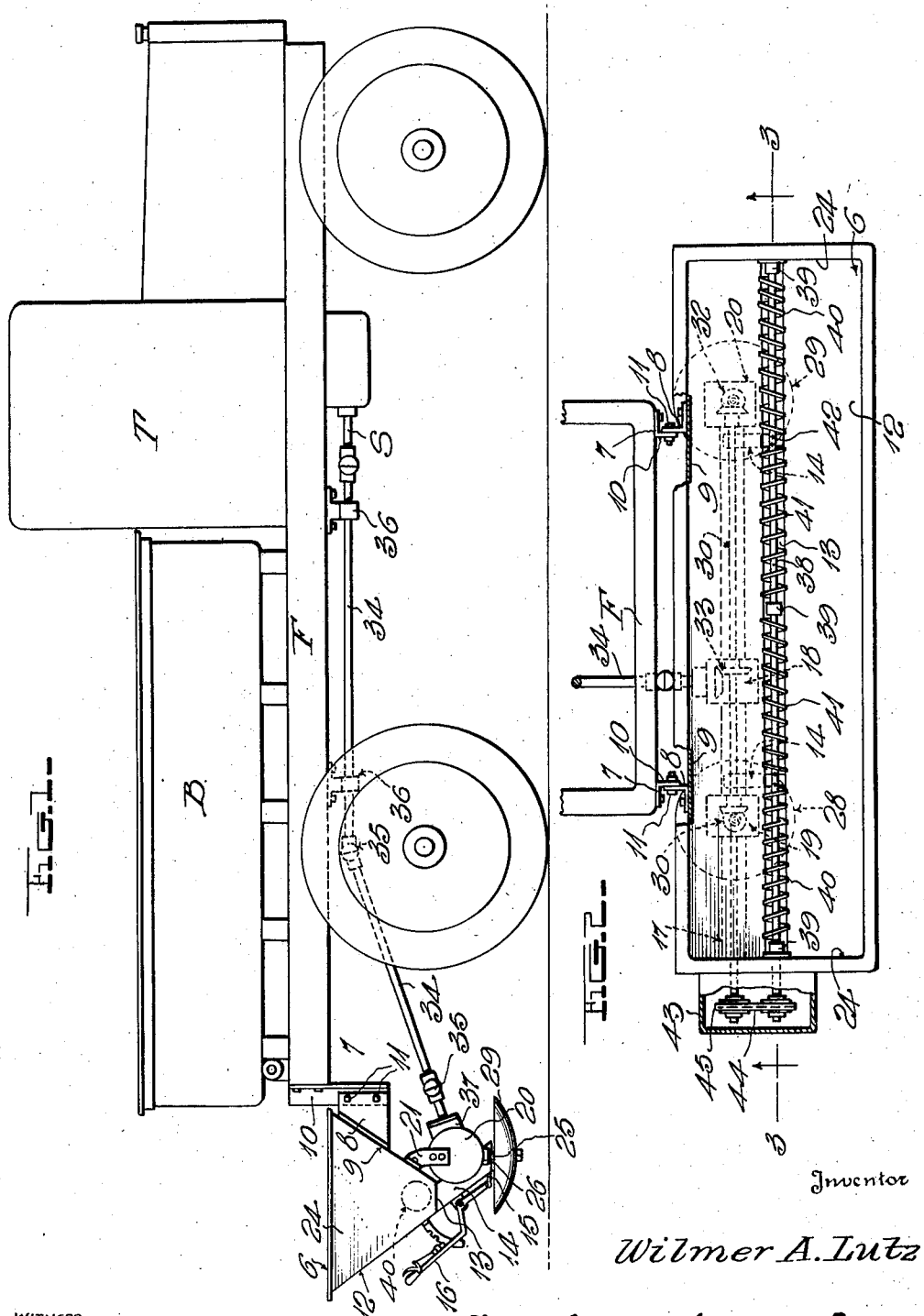

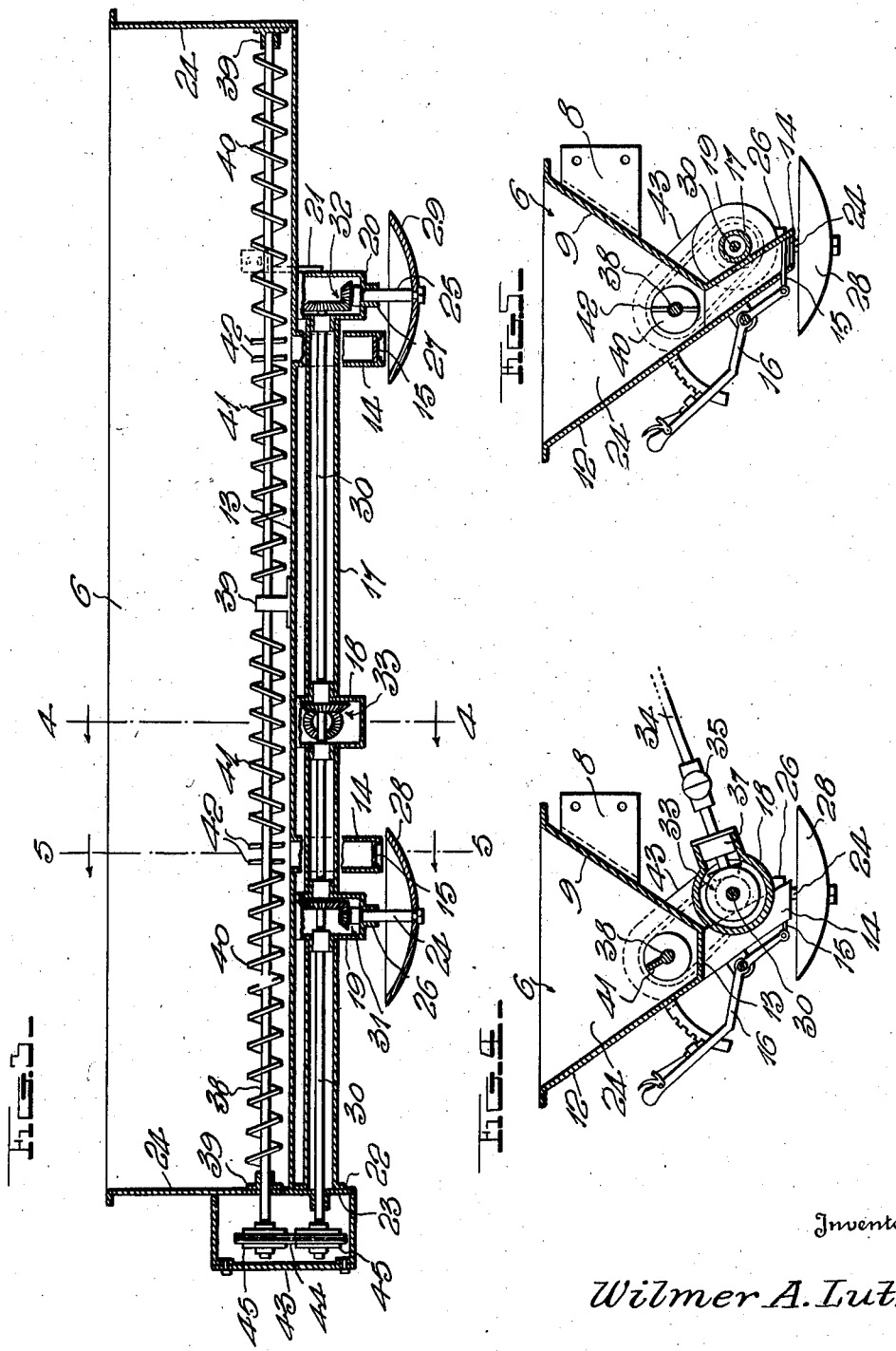

2,099,369

UNITED STATES PATENT OFFICE 2,099,369

LIME SPREADER

Wilmer A. Lutz, Bucyrus, Ohio

Application June 26, 1936, Serial No. 87,563

3 Claims. (Cl. 275—8)

The invention aims to provide a simple, light, inexpensive and efficient lime spreader which may be readily attached to the frame of a dump truck in position to receive the lime from the truck body when the latter is in dumping position and the usual gate of said body is opened sufficiently to allow the lime to gravitate into the hopper of the spreader. Instead of being equipped with ground wheels for driving the spreading, feeding and agitating means, the improved spreader is supported solely by the usual chassis frame of the truck and is operatively connected with a driven part of said truck to be actuated thereby. This part is preferably a power take-off shaft of the truck transmission, which part customarily rotates in the same direction whether the truck be idling, proceeding forwardly, or traveling rearwardly. Thus, the spreading disks of the spreader may be driven in the same direction and the truck driven either forwardly or rearwardly as may be most advantageous.

Figure 1 of the accompanying drawings is a side elevation of the spreader attached to the truck and operatively connected with a power take-off shaft of the transmission.

Fig. 2 is a fragmentary top plan view partly broken away and in section.

Fig. 3 is a sectional view on line 3—3 of Fig. 2.

Figs. 4 and 5 are sectional views on lines 4—4 and 5—5 of Fig. 3.

The structure disclosed in the drawings will be rather specifically described with the understanding, however, that within the scope of the invention as claimed, minor variations may be made. Furthermore, while the device is intended principally for spreading lime, it is obvious that it is not restricted to this particular field of use.

A motor truck T is shown having the usual chassis frame F and dump body B over said frame, and the transmission of the truck includes a power take-off shaft S which is utilized to drive the spreading means and the lime-agitating and feeding means.

A horizontally elongated hopper 6 is disposed at the rear end of the frame F in position to receive the lime from the body B when the latter is tilted to inclined position and the usual gate opened to allow the lime to slide into said hopper. In attaching the hopper 6 to the frame F, I secure vertical angle bars 7 to the rear end bar of the frame and secure angle plates 8 to the front wall 9 of said hopper, said angle bars 7 being provided with rearwardly projecting flanges 10 which are overlapped by the angle plates 8, said flanges and plates being detachably secured together by bolts or the like 11.

The hopper front wall 9 and the back wall 12 converge downwardly and are both inclined as shown, and the hopper bottom 13 is provided with forwardly declined discharge spouts 14 having individually adjustable gates or valves 15 for controlling the discharge of lime therefrom and allowing only one or both of said spouts to function, as may be desired. Levers 16 may well be provided for operating the gates or valves 15.

A tubular shaft housing 17 extends longitudinally under the hopper bottom 13 and is rigidly mounted in the angle between the front wall 9 and the forwardly declined spouts 14, said housing 17 being provided with one enlargement 18 disposed between the spouts 14, and with two other enlargements 19 and 20 disposed between said spouts 14 and the ends of the hopper. The enlargement 20 may well be disposed at one end of the tubular housing 17 and may be secured to an appropriate bracket 21 which is rigidly fastened to the hopper 6, thereby rigidly supporting one end of the housing. The other end of this housing is suitably secured at 22 to a hopper-carried support 23, which support may well be an integral downward extension on one of the end walls 24 of the hopper. If desired, for bracing purposes, the housing 17 may well be lightly welded or otherwise secured to the spouts 14.

Two disk-carrying shafts 24 and 25 pass through bearings 26 and 27 on the bottoms of the enlargements 19 and 20 respectively, the lower ends of said shafts 24 and 25 being provided with spreading disks 28 and 29 respectively, these disks being so related with the spouts 14 that the latter deliver the lime upon the inner portions of said disks as shown, said disks being driven in opposite directions and serving to evenly spread the lime over the ground.

A main shaft 30 is mounted longitudinally in the tubular housing 17, said shaft being connected by gearing 31 in the housing enlargement 19, with the shaft 24, and being similarly connected by gearing 32 in the housing enlargement 20, with the shaft 25. The housing enlargement 18 contains gearing 33 operatively connecting the shaft 30 with a drive shaft 34 whose front end is connected with the shaft S above described. The shaft 34 may consist of sections connected by universal joints 35, and may be mounted upon the frame F by means of one or more bearings 36. The rear end of this shaft is rotatably mounted in an appropriate bearing 37 carried by the housing enlargement 18.

An additional shaft 38 extends within the lower portion of the hopper 6 and is mounted in appropriate bearings 39, said shaft being provided with worms 40 for feeding the lime from the ends of the hopper to the spouts 14, and being provided with additional worms 41 for feeding the lime from the center of said hopper to said spouts. The shaft 38 is also preferably equipped with agitating fingers 42 disposed directly over the spouts 14. One end of the shaft 38 projects beyond one end of the hopper 6 into a small housing 43 secured to said hopper end, which is also true of the shaft 30, and the two shaft ends are operatively connected by a chain 44 and sprockets 45.

The shaft 34 drives the shaft 30 by means of the gearing 33, and said shaft 30 drives the carrying shafts 24 and 25 of the disks 28 and 29, by means of the gearing 31 and 32 respectively. Shaft 30 also drives the lime-feeding and agitating shaft 38 through the instrumentality of the sprocket chain 44 and sprockets 45. Thus, the lime discharged into the hopper 6 will be effectively distributed in said hopper, discharged through the spouts 14 (or only one of them if desired) and effectively spread by the disks 28 and 29 (or by only one if desired). The attachment is a "self-contained" unit which may be quickly and easily attached to or detached from the truck, and said unit may be easily and inexpensively manufactured and hence sold at small cost, yet will be efficient and desirable from numerous standpoints. As the power take-off shaft S which is utilized to drive the spreading means, rotates in the same direction whether the truck be driven forwardly or rearwardly, as previously explained, proper spreading will be accomplished regardless of the direction in which the truck be propelled, it being more desirable under certain conditions to spread while backing the truck, and more desirable under other conditions to spread while driving forwardly.

While excellent results may be obtained with the structure shown and described, attention is again invited to the possibility of making variations within the scope of the invention as claimed.

I claim:—

1. In combination with a motor truck having a chassis frame and a dump body over said frame; a horizontally elongated hopper disposed transversely behind said frame in position to receive material discharged from said dump body, angle bars secured to the rear end of said frame and having rearwardly projecting flanges disposed in parallel vertical planes, forwardly projecting angle plates secured to the front side of said hopper in parallel vertical planes and overlapping said flanges, bolts securing said angle plates to said flanges, means for spreading the material discharged from said hopper, and driving means operatively connecting said spreading means with a driven part of the truck.

2. In a spreading attachment for a dump truck, an elongated hopper having inclined front and rear walls and two forwardly declined discharge spouts, a tubular shaft housing extending longitudinally of said hopper and secured in the angle between said inclined front wall and said forwardly declined spouts, said tubular housing having one enlarged portion between said spouts and other enlarged portions between said spouts and the ends of the hopper, a main shaft mounted longitudinally within said housing, spreading disks having carrying shafts extending through the bottoms of and supported by said other enlargements, gearing in said other enlargements operatively connecting said main shaft with said disk-carrying shafts, a drive shaft extending into said one enlargement, and gearing in this enlargement operatively connecting said drive shaft with said main shaft.

3. In a spreader, an enlogated hopper having two longitudinally spaced discharge spouts, a tubular shaft housing extending longitudinally under and fixed with respect to said hopper, said tubular shaft housing having one enlarged portion between said spouts and having other enlarged portions between the ends of the hopper and said spouts, a casing secured to one end of said hopper and projecting downwardly therefrom, one end of said tubular shaft housing being extended to and secured to the inner side of said casing, a main shaft mounted longitudinally within said housing and having one end extending into said casing, spreading disks having carrying shafts extending through the bottoms of and supported by said other enlargements, gearing in said other enlargements operatively connecting said main shaft with said disk-carrying shafts, a drive shaft extending into said one enlargement, gearing in this enlargement operatively connecting said drive shaft with said main shaft, an additional shaft mounted longitudinally in the hopper and having means for agitating the material and feeding it to said spouts, and driving means for said additional shaft disposed within said casing and connecting said additional shaft with said one end of said main shaft.

WILMER A. LUTZ.